H. KANONENBERG.
WHEELED GUN CARRIAGE.
APPLICATION FILED MAR. 20, 1909.
932,025.
Patented Aug. 24, 1909.
2 SHEETS—SHEET 1.
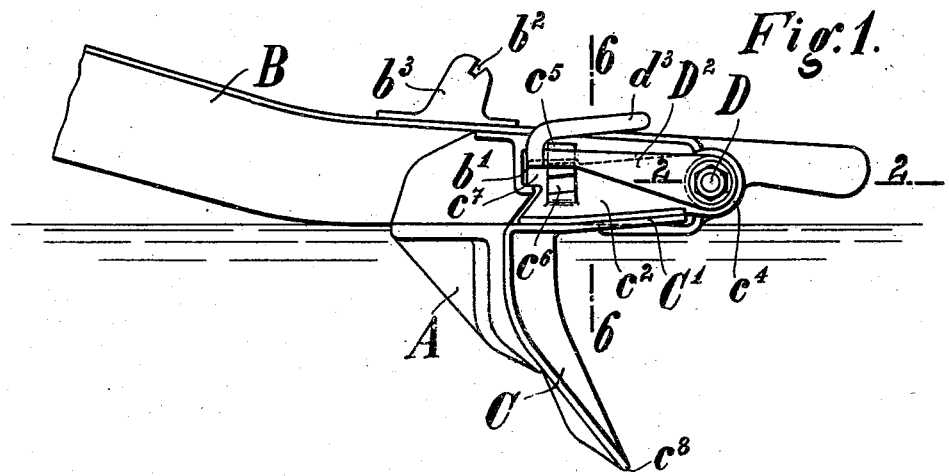
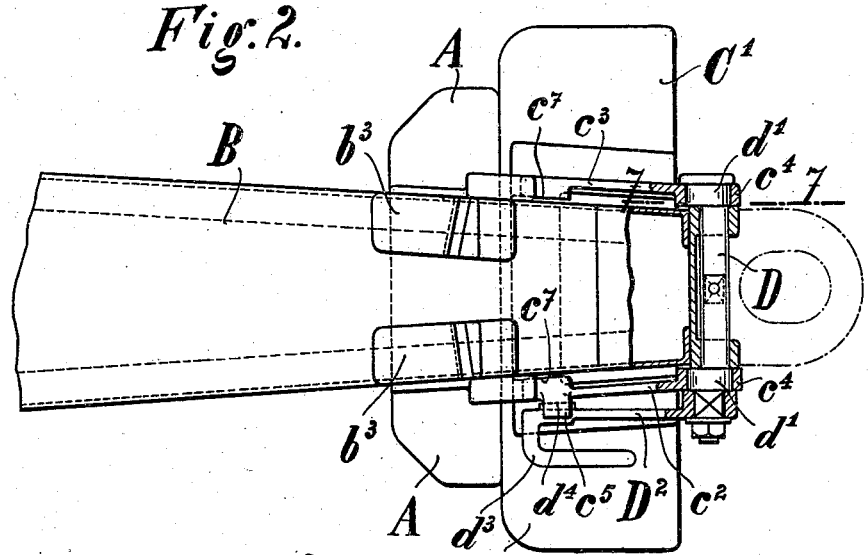
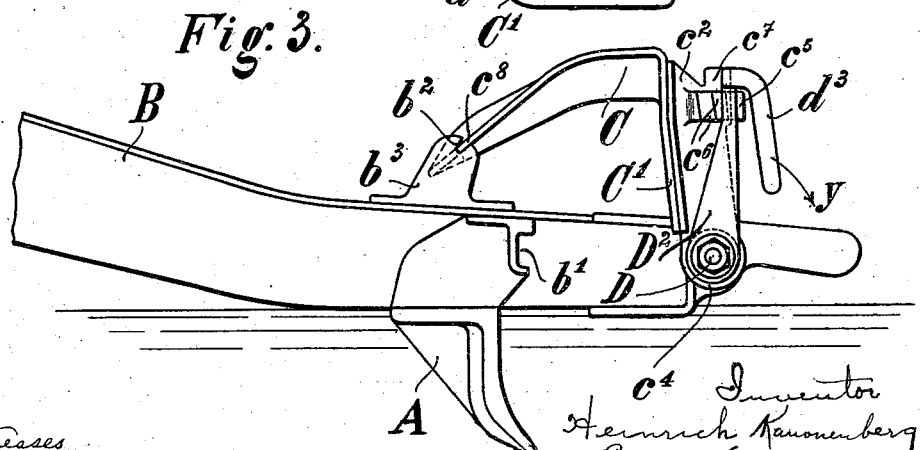

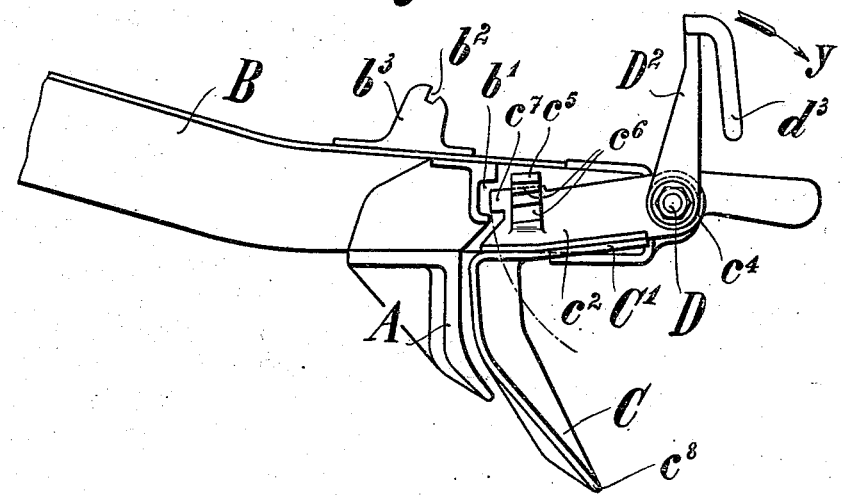
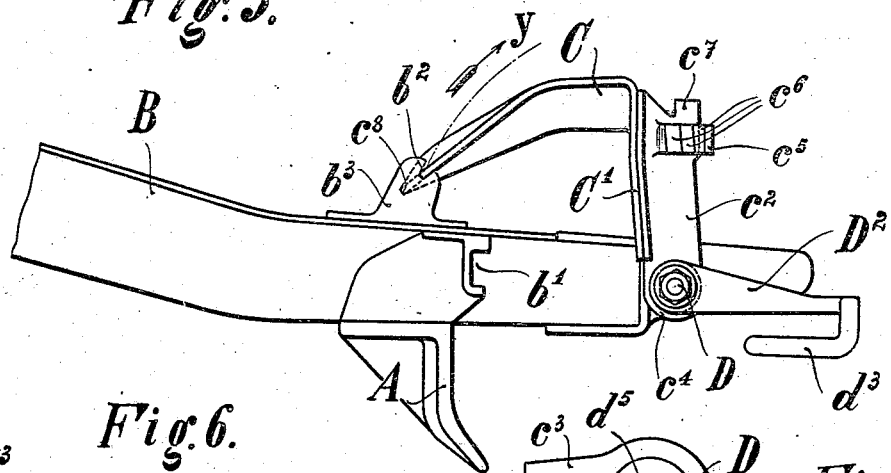
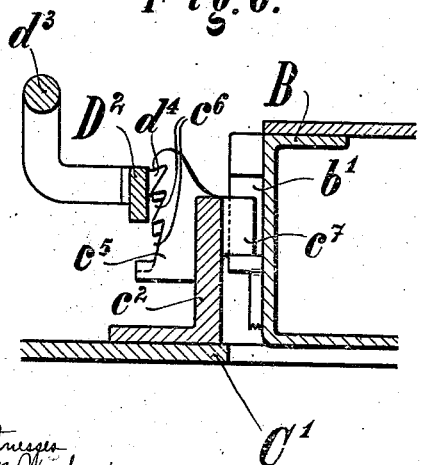
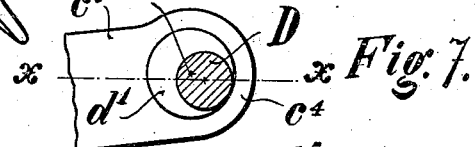
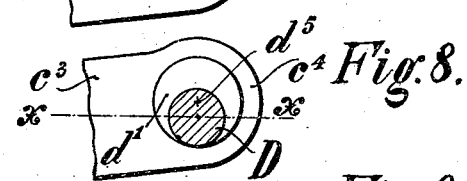
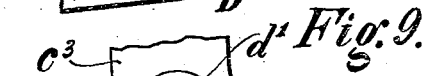

UNITED STATES PATENT OFFICE.

HEINRICH KANONENBERG, OF ESSEN-ON-THE-RUHR, GERMANY, ASSIGNOR TO FRIED. KRUPP AKTIENGESELLSCHAFT, OF ESSEN-ON-THE-RUHR, GERMANY.

WHEELED GUN-CARRIAGE.

932,025.  Specification of Letters Patent.  Patented Aug. 24, 1909.

Application filed March 20, 1909. Serial No. 484,769.

*To all whom it may concern:*

Be it known that I, HEINRICH KANONENBERG, a subject of the Emperor of Germany, and a resident of 99 Rellinghauserstrasse, Essen-on-the-Ruhr, Germany, have invented certain new and useful Improvements in Wheeled Gun-Carriages, of which the following is a specification.

The present invention relates to the type of wheeled gun-carriages which is provided with a fixed spade and with a spade shiftable into and out of working position and in which the shiftable spade, when it is in its working position, lies against the fixed spade.

The object of the invention is to provide a gun-carriage of this type in which the fixed spade is capable of constantly relieving the shiftable spade of strain in an effective manner when the shiftable spade is in the working position.

In accordance with the present invention this object is attained by providing means for pressing the shiftable spade when in the working position, against the spade which is fixed on the trail of the carriage.

One embodiment of the invention is shown in the accompanying drawings by way of example.

Figure 1 is a side view of the trail of a wheeled gun-carriage. Fig. 2 is a top view of Fig. 1, partly in section on line 2—2, Fig. 1; Figs. 3 to 5 are side views corresponding to that shown in Fig. 1 but showing different positions of some of the parts; Fig. 6 is a section on line 6—6, Fig. 1, looking from the left; Fig. 7 is a section on line 7—7, Fig. 2, looking from below; Fig. 8 is the same section as that shown in Fig. 7, the parts being in the position shown in Fig. 4, and Fig. 9 is the same section as that shown in Fig. 7, the parts being in the position shown in Fig. 5. Figs. 6 to 9 are on an enlarged scale.

A indicates the spade which is fixed on the gun-trail B and which is adapted for use on hard ground and C $C^1$ indicates the shiftable spade which is adapted for use on soft ground. The spade C $C^1$, which mainly consists of the spade-blade C and a press-plate $C^1$, is provided with two parallel arms $c^2$ and $c^3$ which, by means of eyes $c^4$, are swingingly connected to trunnions $d^1$ (Fig. 2) on a bolt D which is rotatably mounted in the trail B. The common axis of the trunnions $d^1$, that is the axis of rotation of the spade C $C^1$, is eccentrically located relatively to the axis of rotation of the bolt D (see especially Figs. 7 to 9) so that a turning movement of the bolt D will effect a displacement of the axis of rotation of the spade.

As shown in Fig. 2 the bolt D is composed of two parts and on one end of the bolt is rigidly secured an operating lever $D^2$ which is provided with a handle $d^3$. The lever $D^2$, which is made from elastic material, such as steel, is provided with a lateral projection $d^4$ for which a plurality of notches $c^6$ are provided in a lateral projection $c^5$ on the adjacent arm $c^2$. The projection $c^5$ on the arm $c^2$ projects into the path of movement of the projection $d^4$ on the lever $D^2$ to such an extent that a comparatively great amount of lateral bending of the lever $D^2$ is required to bring the projection $d^4$ into or out of engagement with one of the notches $c^6$.

The arms $c^2$ and $c^3$ of the spade C $C^1$ are provided with noses $c^7$ which, when the spade is in its working position shown in Fig. 1, engage in corresponding notches $b^1$ provided in the side walls of the gun-trail. In this position of the spade C $C^1$, the spade-blade C contacts with the entire opposing surface of the blade of the fixed spade A and the central part of the press-plate $C^1$ of the spade C $C^1$ lies against the bottom-surface of the trail. When the spade C $C^1$ is in the ineffective position shown in Fig. 3 the cutting edge $c^8$ of the spade-blade C engages in two notches $b^2$ which are provided in two supports $b^3$ arranged on the upper face of the trail.

When the spade C $C^1$ is in the position shown in Fig. 1 and the lever $D^2$ is brought into engagement with the notch $c^6$ of the arm $c^2$ which is farthest from the press-plate $C^1$ the trunnions $d^1$, which are eccentrically disposed relatively to the bolt D, assume the position shown in Fig. 7. In this figure, and also in Figs. 8 and 9, the axis of the trunnions $d^1$ is projected in the point $d^5$ and the plane which contains the axis of the bolt D and is parallel to the supporting plane of the carriage, is projected in the straight line $x$—$x$.

It will be seen from Fig. 7 that, when the lever $D^2$ is in the position just mentioned, the point $d^5$ is located near its left dead point relatively to the line $x$—$x$ and the arrangement is selected in such a manner that, when the lever $D^2$ is brought into engagement with one of the notches $c^6$ which is located nearer to the press-plate $C^1$, the point approaches the adjacent dead point without, however, passing beyond the same. When the lever $D^2$ assumes the angular position shown in Fig. 4 the point $d^5$ is in its intermediate position as shown in Fig. 8. When the lever $D^2$ is turned from the position shown in Fig. 1 to the angular position shown in Fig. 4 the spade $C$ $C^1$ must therefore move to the right and the arrangement is selected in such a manner that the projections $c^7$ of the arms $c^2$ and $c^3$ of the spade $C$ $C^1$ then move so far out of the notches $b^1$ that they are free to swing past the lower wall of the notches $b^1$, as shown in Fig. 4.

When the spade $C$ $C^1$ is in the position shown in Fig. 3 and the lever $D^2$ is brought into engagement with one of the notches $c^6$ in the arm $c^2$ the lever $D^2$ assumes approximately the same angular position as that shown in Fig. 4; the point $d^5$ is therefore in this instance located near its intermediate position shown in Fig. 8. In this position of the parts a swinging movement of the spade $C$ $C^1$ about the trunnions $d^1$ $d^1$ cannot take place. When the lever $D^2$ is turned from the position shown in Fig. 3 to the angular position shown in Fig. 5, in which, as shown in Fig. 9, the point $d^5$ is in its right dead point relatively to the line $x$—$x$, the spade $C$ $C^1$ must move to the right and the arrangement is selected in such a manner that the cutting edge $c^8$ of the spade then passes so far out of the notches $b^2$ that the spade is free to be swung in the direction of the arrow $y$, as shown in Fig. 5.

During the travel of the gun, or when the spade A alone is used, the shiftable spade $C$ $C^1$ assumes the position shown in Fig. 3 in which it, while secured against swinging movement, rests with its cutting edge $c^8$ in the notches $b^2$ of the supports $b^3$. In this case the lever $D^2$ is adjusted in such a manner that its projection $d^4$ is in engagement with one of the notches $c^6$ in the arm $c^2$.

To shift the spade $C$ $C^1$ into the working position the gun-trail is raised and, after the lever $D^2$ has been bent laterally to such an extent that its projection $d^4$ has passed out of engagement with the appurtenant notch $c^6$, the lever $D^2$ is turned in the direction of the arrow $y$ to the position shown in Fig. 5. Due to the eccentric arrangement of the trunnions $d^1$ the spade $C$ $C^1$ is thereby moved so far to the right that its cutting edge $c^8$ can swing out of the notches $b^2$. The spade $C$ $C^1$ is thereupon swung in the direction of the arrow $y$ until it lies with the central part of its press-plate $C^1$ against the lower wall of the trail and simultaneously therewith the lever $D^2$ is swung in the direction of the arrow $y$ until it reaches the position shown in Fig. 4. In this position of the lever $D^2$ the noses $c^7$ on the arms $c^2$ and $c^3$ are located at the same elevation as the notches $b^1$ without however engaging in the notches. Thereupon the lever $D^2$ is turned in the direction opposite to the arrow $y$. The spade $C$ $C^1$ is thereby moved to the left so that the noses $c^7$ on the arms $c^2$ and $c^3$ are pushed into the notches $b^1$. A short time before the lever $D^2$ has reached the position shown in Fig. 1 the blade $C$ of the spade $C$ $C^1$ comes into abutment with the spade A. The lever $D^2$ can then only be turned farther on the application of comparatively great force. The turning of the lever $D^2$ is continued until its projection $d^4$ snaps into that notch $c^6$ in the projection $c^5$ which is farthest from the press-plate $C^1$. As the axis of the trunnions $d^1$, in this position of the lever $D^2$, is near its dead point a toggle-lever action takes place during the last part of the turning movement of the lever $D^2$ and this action causes the spade $C$ $C^1$ to be pressed with great force against the spade A. The spade $C$ $C^1$ is then in an effective manner coupled to the spade A. Consequently the spade $C$ $C^1$ is to a great extent relieved of strain during firing.

If the parts become worn or change their position due to shocks or some other cause and the pressure thereby becomes insufficient with which the spade $C$ $C^1$ is pressed against the spade A in the position of the lever $D^2$ shown in Fig. 1, this fact can easily be compensated for by bringing the projection $d^4$ of the lever $D^2$ into engagement with one of the notches $c^6$ nearer to the press-plate $C^1$, it being readily understood that this will cause an increase in the pressure. In this manner it is possible to constantly relieve the shiftable spade of strain by means of the spade A which is fixed on the trail.

It will readily be understood from the foregoing and need not be explained in what manner the shiftable spade $C$ $C^1$ is brought from the working position to the position shown in Fig. 3.

Having thus described the invention, what is claimed and desired to be secured by Letters Patent is:

1. A wheeled gun-carriage having a fixed spade and a spade shiftable into and out of working position, and means for pressing the shiftable spade against the fixed spade when the shiftable spade is in its working position.

2. A wheeled gun-carriage having a fixed spade and a second spade adapted to be shifted from an ineffective position to a working position in which it lies against the fixed spade, and means for pressing the second spade against the fixed spade when the second spade is in its working position.

3. A wheeled gun-carriage having a fixed spade and a second spade adapted to be shifted from an ineffective position to a working position in which it lies against the fixed spade, and means for pressing the second spade against the fixed spade when the second spade is in its working position, said second spade having its blade contacting with the entire opposing surface of the blade of the fixed spade when the second spade is in its working position.

The foregoing specification signed at Barmen, Germany, this 8th day of February, 1909.

HEINRICH KANONENBERG. [L. S.]

In presence of—
  OTTO KÖNIG,
  W. W. BRUNSWICK,